(12) United States Patent
Johnson et al.

(10) Patent No.: US 8,939,071 B2
(45) Date of Patent: Jan. 27, 2015

(54) PITTING APPARATUS

(76) Inventors: Nolton Johnson, Bend, OR (US);
Michael Hendricks, Yakima, WA (US);
Andrew Shutz, Monument, OR (US)

( * ) Notice: Subject to any disclaimer, the term of this patent is extended or adjusted under 35 U.S.C. 154(b) by 801 days.

(21) Appl. No.: 12/909,791

(22) Filed: Oct. 21, 2010

(65) Prior Publication Data
US 2011/0088570 A1    Apr. 21, 2011

Related U.S. Application Data

(60) Provisional application No. 61/253,785, filed on Oct. 21, 2009.

(51) Int. Cl.
*A47J 25/00*   (2006.01)
*A23N 4/24*    (2006.01)
*A23N 4/06*    (2006.01)

(52) U.S. Cl.
CPC ........................................ *A23N 4/06* (2013.01)
USPC .................. 99/549; 99/557; 99/565

(58) Field of Classification Search
USPC .......... 99/490, 542, 544, 547, 549, 550, 555, 99/556, 557, 559, 565
See application file for complete search history.

(56) References Cited

U.S. PATENT DOCUMENTS 2,180,647 A * 11/1939 Steinbiss ......................... 99/548
4,108,217 A *  8/1978 Westberg, II ................. 140/105
5,577,439 A * 11/1996 Cimperman et al. ........... 99/549

* cited by examiner

*Primary Examiner* — Dana Ross
*Assistant Examiner* — Lindsey C Teaters
(74) *Attorney, Agent, or Firm* — Donn K. Harms

(57) ABSTRACT

A device configured for the removal of pits from fruits such as cherries. The device features a planar rotating circular disk which rotates on an incline. A ramp deposits fruit on a top surface of the disk at a lower portion of the incline which keeps the fruit from moving with the surface of the disk. Depressions in the disk engage with individual fruit which is carried to a needle punch which translates through the fruit and an aperture communicating through the depression and the disk to push the pit out the fruit. An elastic member pulls the pits from the needles.

20 Claims, 2 Drawing Sheets

PITTING APPARATUS

FIELD OF THE INVENTION

This application claims priority to U.S. Provisional Patent Application No. 61/253,785 filed on Oct. 21, 2009. The disclosed method relates to pitting of produce products such as cherries and olives. More particularly, it relates to a simplified pitting device adapted for use by small farms, home-growers and collectives, for pitting of produce products requiring such. The device provides a cost-effective means to replace the time consuming hand-pitting method, yet provides the speed and cost reductions that only the economy of scale that mechanization can provide. It does so at a cost significantly less than commercial pitting machines placing it within the financial reach of such small concerns.

BACKGROUND OF THE INVENTION

Pitting of fruits such as cherries and olives has been a time-consuming factor for small and large commercial growers for many decades. In order to employ a fruit such as cherries for preserves, salads, or pies and the like, the fruit once picked, must be processed to remove the pit at the center of the fruit which in nature functions as a seed.

Conventionally, pitting machines are employed by large companies and large grower cooperatives possessing the financial wherewithal to purchase or lease the machines capable of removing the pit from cherries and the like. Many such pitting devices are only leased to users and also require a royalty payment per pound of fruit that has been de-pitted, in addition to lease payments. While large expensive machines may work well for such large suppliers and food processors, small concerns such as family farms and organic food producers growing their own produce do not have that financial capability to purchase and lease the expensive conventional machinery. Such small growers are at the mercy of the larger processors for their fruit or have had to find other means to de-pit such foods should they wish to sell it for increase profit.

Hand pitting is a particularly expensive and time-consuming process if employees are used who must be paid. Further the workers are subject to repetitive injuries to their hands and fingers due to the actions required to de-pit fruit such as cherries. Family concerns not paying family members to pit still must take valuable time from other chores to remove the pits from produce they process so they can be cooked in pies and preserves or provided to local restaurants at increased prices.

Consequently, there is an unmet need for a pitting device, which is simple in operation to thereby minimize maintenance costs, and also has a very short learning curve for small users. Such a device should be inexpensive enough for small concerns to own and use and provide sufficient mechanization to speed up the pitting process and allow increase production for cooking and provision to restaurants and the like which is a mainstay of small producers. Mechanically, such a device needs to be simple in construction to allow for user maintenance as well as to provide for reduced chance of equipment failure that simplicity in design affords.

With respect to the above, before explaining at least one preferred embodiment of the pitting invention herein in detail or in general, it is to be understood that the device and mode of operation disclosed herein is not limited in its application to the details of construction and to the arrangement of the components or the steps set forth in the following description or illustrated in the drawings. The various methods and combinations of components of the pitting apparatus of the disclosed invention are capable of other embodiments, and of being practiced and carried out in various ways, all of which will be obvious to those skilled in the art once the information herein is reviewed. Also, it is to be understood that the phraseology and terminology employed herein are for the purpose of description and should not be regarded as limiting.

As such, those skilled in the art will appreciate that the conception upon which this disclosure is based, may readily be utilized as a basis for other pitting machines and the like, for carrying out the several purposes of the present disclosed device and method. It is important, therefore, that the embodiments, objects and claims herein, be regarded as including such equivalent methodology and operational components insofar as they do not depart from the spirit and scope of the present invention.

SUMMARY OF THE INVENTION

The present invention contemplates a novel solution to the provision of an inexpensive yet highly productive pitting machine for small farms and homes and the like. Such farms frequently have a compressed air supply on the property for other reasons and in the favored mode of the device herein, such availability of compressed air has been taken advantage of to impart simplicity to the device in construction and operation. Employing compressed air, the device requires no electric motors or sensors and instead employs the simplicity of mechanical components for registering positions of the fruit to be pitted as well as operating the other components of the device. Of course those skilled in the art will realize that many of the components herein have electrically driven counterparts, and as such, the employment of such alternative means for powering and operating the device are anticipated within the scope of this invention.

The device employs a disk which is rotationally engaged to a frame and has a plurality of lines of apertures radially spaced about the center point of the disk. A feed chute is provided for the fruit to be deposited upon the disk. The chute slants downward toward the disk which rotates on an inclining plane around its rotational engagement to the frame. By providing the chute for cherries and the like at a downward angle which deposits the fruit at a deposit position on the disk and rotating the disk in a plane that is inclining relative to the point of intersection of the chute and the disk, a means to maintain a supply of fruit at the deposit position is provided. Since the fruit is unable to roll up the incline of the disk, it settles in a group at the deposit position on the disk. The rotating disk, with the radially disposed rows of apertures continually rotates in increments under the backward rolling fruit some of which will fall into the apertures in each radially disposed lines of apertures. Thus, the user simply pours the fruit on the chute and it piles upon the rotating disk at the bottom unable to move up the incline of the disk when rotating. The apertures rotating under the pile of fruit in the deposit position are each sized to hemispherically engage under the bottom half of an individual respective piece of fruit, and thereafter carry it up the inclining disk and around the axis as the disk rotates.

Rotation of the disk is in radial increments such that each individual radially positioned row of apertures, all of which are equidistant from adjacent rows, is placed in an individual sequentially registered position around the axis with each incremental rotation of the disk. This rotation of the disk is imparted by a cylinder engaged to a member having a pin at a distal end sized to engage notches formed in the circumference of the disk. Air driving the cylinder causes it to pull the disk forward to the next incremental position of each single rotation of the disk around its axis. Once pulled forward, the member extending from the air cylinder releases its engagement on the notch to which it is engaged, and moves rearward on the circumference of the disk to engaged a trailing notch operatively positioned to cause the rows of apertures to move to their incremental registered positions radially around the axis of the disk.

Because the recesses holding individual fruits in the rows of depressions on the disk, sequentially move to positions of registered positioning of the rows around the axis of the disk, the cherries or other fruit occupying the rows may be sequentially processed to remove the pits from their centers. An aperture communicates from the bottom surface of the disk, opposite the recessed surface.

At one incremental position of each row containing cherries or fruit in the depressions, the fruit is pitted by a plurality of air driven translating pitting needles which are driven through each respective fruit and through its aperture communicating through the disk with each respective depression. Adjacent to the underside of each such aperture is a rubber or other flexible member having a plurality of apertures therein dimensioned to engage the star-shaped pit needles passing through the apertures. The flexible member using star-shaped apertures therein configured to hug the star-shaped pit needles passing therethrough, and allow the pit being pushed to pass through, but to pull it off the pit needle as it is being retracted. The flexible resilient member thus provides a means to pull the pits from the distal end of the pit needles as the pit needles reverse translation in a reciprocating movement.

So pulled, the pits fall into a collection container. Optionally, but preferred, an optical system will monitor each aperture in each depression through which the pit needles pass, and ascertain if a pit is rejected. For each aperture and depression combination where a pit is counted, the remaining fruit is pushed or blown from its depression into a collection container for good fruit. Should the optic sensors sense that a pit has not been pushed from the fruit by the pitting needle, that individual fruit will be pushed or blown to a different collection container for reprocessing. In this fashion, it is determined that all fruit is pitted before moving from the device.

As noted, removal of the pitted and un-pitted fruit from their respective depressions may be accomplished by air jets blowing during an incremental stop on the rotation after the pit removal has been accomplished. Or mechanical means in reverse of the pitting needles may be employed to push each fruit up from its engagement in an individual depression.

Biased members are provided as an additional means to maintain the disk in individual registered positions as it rotates around its access.

The foregoing has outlined rather broadly the more pertinent and important features of the pitting device herein. This is provided in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other pitting devices of similar operation for carrying out the same purposes of the present invention. It should also be realized by those skilled in the art that such equivalent constructions and methods do not depart from the spirit and scope of the invention as set forth in the appended claims.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways all of which are considered to be within the scope of this patent. Also, it is to be understood that the phraseology and terminology employed herein are for the purpose of description and should not be regarded as limiting.

The Objects of the Invention

It is therefore an object of the present invention to provide a simple yet reliable pitting device for employment on small farms and the like.

It is another object of this invention to provide such a pitting device that is simple in mechanical design to minimize maintenance and allow it to be user serviced.

The foregoing has outlined some of the more pertinent objects of the invention. These objects should be construed to be merely illustrative of some of the more prominent features and applications of the intended invention. Many other beneficial results can be attained by applying the disclosed method and device in a different manner or by modifying the invention within the scope of this disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The accompanying drawings, which are incorporated in and form a part of this specification, illustrate embodiments of the invention and together with the detailed description, serve to explain the principles of this invention.

DETAILED DESCRIPTION OF THE PREFERRED EMBODIMENTS

Figure 1:
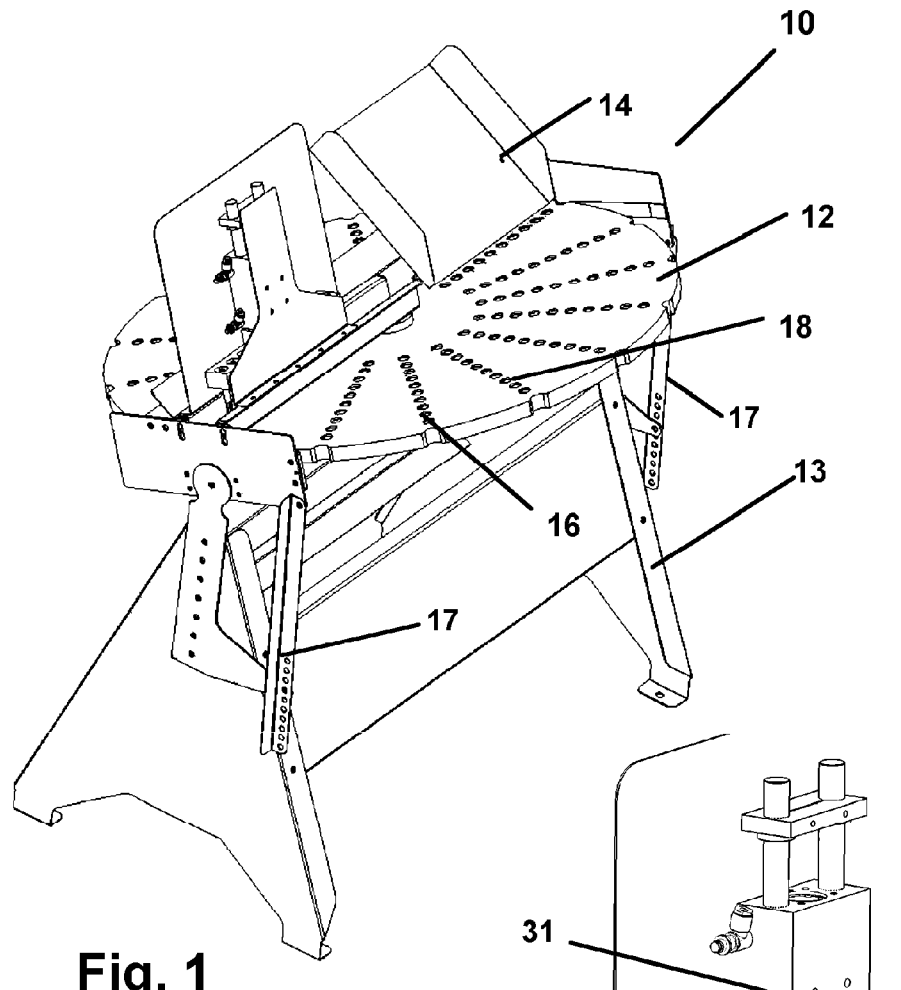
FIG. 1 depicts an overhead perspective view of the device showing the rotationally engaged disk and readily extending rows of depressions and communicating apertures.
Figure 2:
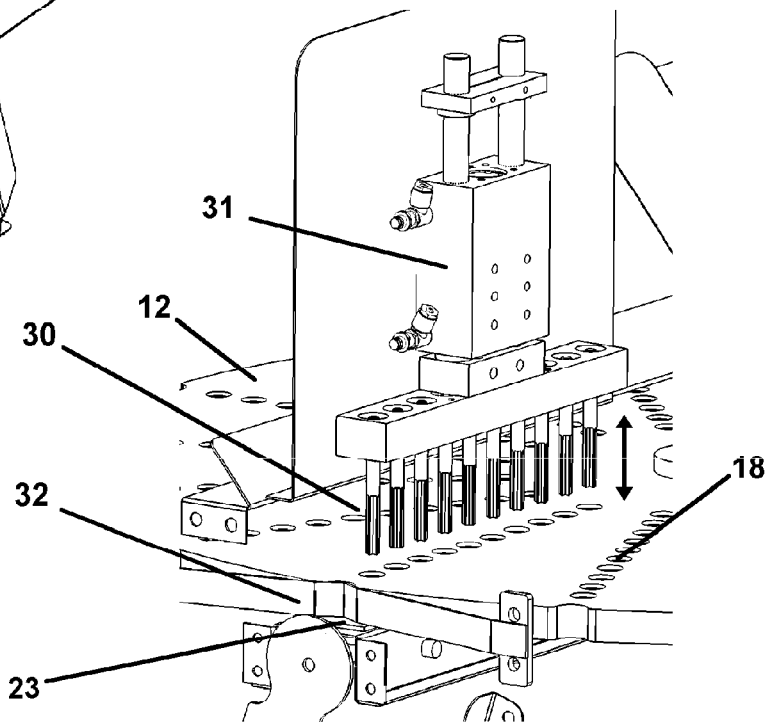
FIG. 2 shows the plurality of translating pitting needles which align with a row of fruit settled into the depressions and translate to push pits from the fruit.
Figure 3:
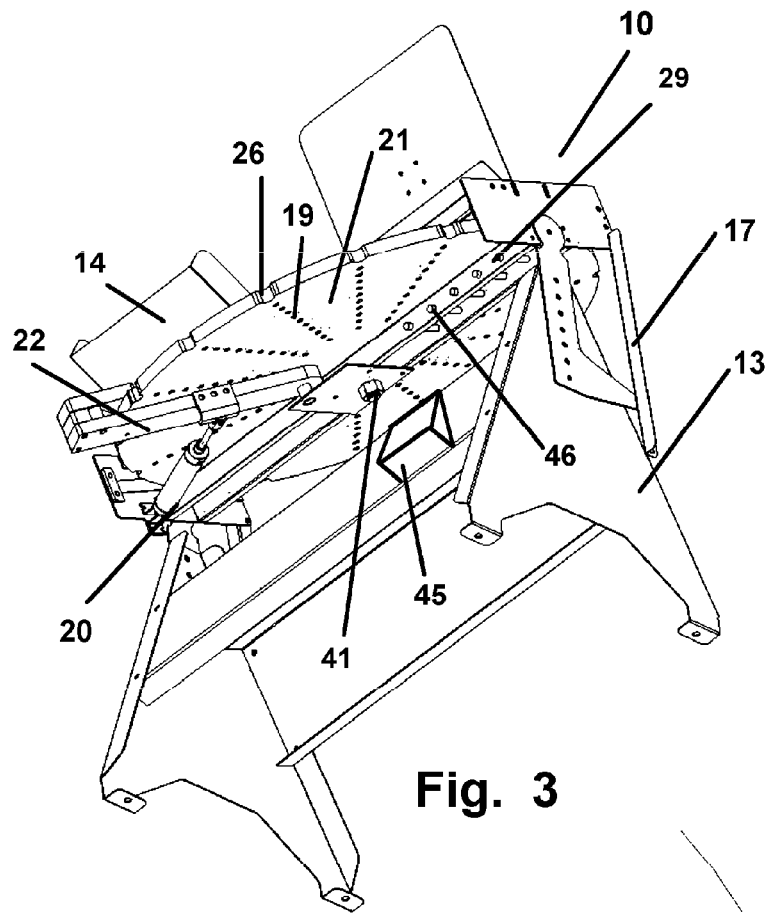
FIG. 3 shows the bottom view of the device of FIG. 1.
Figures 4, 4A:
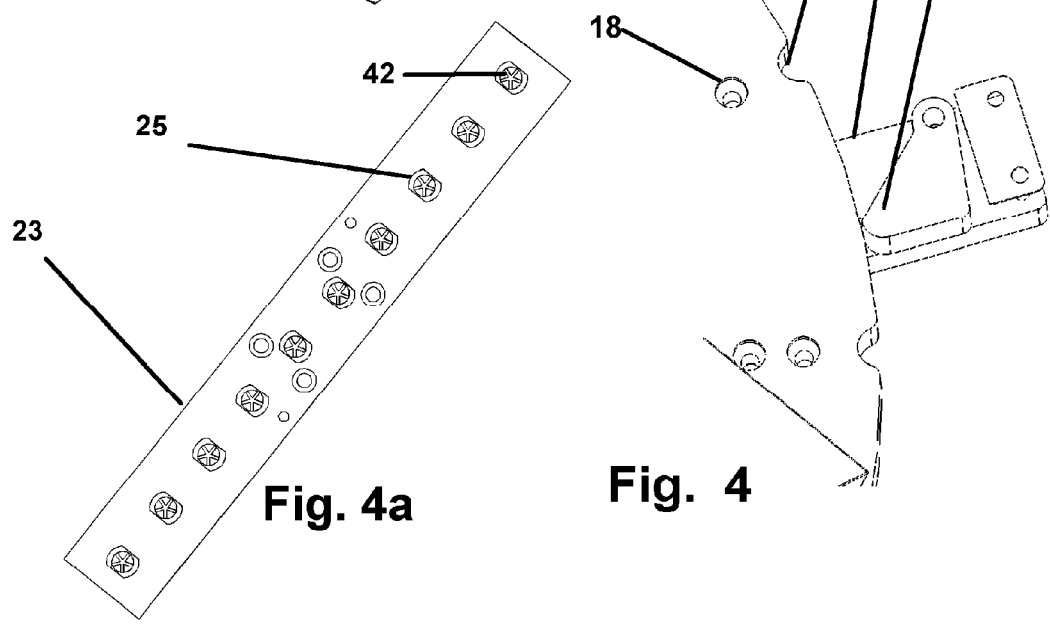
FIG. 4 depicts the distal end of the member employed to rotate the disk by engagement within slots incrementally formed in the perimeter to provided means for registered incremental positioning of the rows circling the disk axis during rotation.
FIG. 4a depicts the planar resilient member having apertures adapted to slidably engage the pitting needles and insure removal of pits.

Referring now to the drawings of FIGS. 1-4, wherein similar parts of the invention are identified by like reference numerals, there is seen in FIG. 1 an overhead perspective view of the device 10 showing the rotationally engaged disk 12 rotating at an incline on its axis 41 engaged to the crossbar 29 which in turn is engaged to the frame 13.

From its intersection across a portion of the disk 12 locating below the lower end of the ramp 14 where fruit is deposited, the disk 12 rotates around its axis 41 at an inclined angle relative to the bottom of the ramp 14 and the level surface supporting the frame 13. The incline of the surface of the disk 12 creates collection area on the top of the disk 12 in front of the ramp 14. The incline of the disk 12 is adjustable and provides a means to adjust the force urging the fruit toward the collection area. This is because gravity acting on the fruit due to the incline of the disk 12 is sufficient to provide a means to urge the fruit deposited on the disk 12 from the ramp 14, to roll backward toward the ramp 14 during each increment of rotation of the disk 12 around the axis. The urging of the fruit by the inclination of the disk 12 and gravity acting on the fruit, provides a means to form a group or pile of fruit, to collect on the disk 12 in the collection area front of the ramp 14.

The frame 13 employs members 17 to adjust the angle of the crossbar 29 providing the support for the axis of the disk 12. An adjustment of the member 17 in its connection to the frame 13 provides a means to tip the crossbar 29 relative to the frame 13 and the level support surface, and thereby adjust the incline angle of the disk 12 riding on the axis 41 on the substantially level axis of the crossbar 29. This means to adjust the urging of the fruit against the direction of rotation of the disk 12 during deposit from the ramp 14 is most preferred as the type of fruit, and the speed of the disk 12 during processing, may require an adjustment of the angle to increase or decrease the urging of the processed fruit to area at the bottom of the ramp 14. This gathering of the fruit keeps pieces from rotating on the disk 12 unless they are in an individual recess 18 which has sufficient connection to overcome the force of the rearward bias from the incline of the disk 12. Heavier fruit or faster speeds of the disk 12 would require more incline to keep the collecting fruit at the bottom of the ramp 14 from starting to rotate with the disk 12 outside of an engagement with a recess 18.

As noted, under the fruit collected in a pile at the bottom of the ramp 14 and on the top surface of the disk 12, are positioned individual rows 16 of recesses 18 equidistantly radially positioned around the disk 12. The recesses 18 rotate around the axis 41, with each incremental rotational movement of the disk 12.

The incrementally rotating disk 12, with the radially disposed rows 16 of recesses 18 continually rotates in radial increments under the rearward or backward biased fruit. Because of the incline, the disk surface 12 will slide under the gathered fruit unless the individual pieces fall into the recesses 18 passing under the pile of fruit urged to the bottom of the ramp 14.

In use, the user simply pours the fruit on the ramp 14 and gravity deposits the fruit upon the disk 12 where it forms a pile upon the upwardly angling rotating disk 12. This provides a means to prevent the fruit from rotating on the disk 12 around the axis 41 unless a piece of fruit is positioned within a recess 18.

The recesses 18 rotating under the pile of fruit in the deposit position at the bottom of the ramp 14, are each sized to hemispherically engage under the bottom of an individual respective piece of fruit, and thereafter carry it around the axis 41 and up the incline situated within an engagement with the rotating disk 12. Only fruit engaged within recesses 18 will overcome the rearward urging caused by the angled disk 12 and will therefor continue around the axis engaging as the disk 12 to the frame. For different sized fruit, or different speed devices, a plurality of disks 12 may be provided with different sized recesses 18 to accommodate different types and sizes of fruit and different numbers of radially positioned rows 16. Thus the device 10 can be sold as a kit including a plurality of disks 12 or available disks 12 each adapted to rotate on the axis 41 and each having a different configuration of the recesses 18 to accommodate processing of fruit. Such configurations adaptations can include more or less recesses 18 per row 16, more or less rows per disk 12, different sized hemispheric recesses 18 to accommodate larger or smaller fruit, and combinations thereof. In this fashion one device 10 is employable for a plurality of different fruits such as olives, cherries, or other fruits with pits.

During operation and rotation the disk 12 it rotates in individual radians such that each individual radially positioned row 16 of recesses 18, is placed in an individual sequentially registered position in rows 16 around the axis 41 with each incremental rotation of the disk. A favored means to impart the rotation of the disk is through the employment of a pneumatic or hydraulic cylinder 20 with a conventional extending cylinder member engaged to a member 22. The member in turn has a pin 24 at a distal end which is sized to engage notches 26 formed in the circumference of the disk 12.

Compressed air driving the extending arm portion of the cylinder 20 causes it to force the disk 12 forward to the next incremental position of a notch 26 to rotate the disk 12 in increments equal to the radians of the rows 16 and thereby rotating the disk 12 around the axis 41. Compressed air is preferred as a means to rotate the disk 12 as most small processors have it on site. However, those skilled in the art will realize that a DC electric motor or other means to slide the member 22 to engage notches 26 may be employed as a means to rotate the disk 12. Alternatively, an electric motor and electronic registration of the disk to correct positioning can also be employed as a means to rotate the disk 12 in increments around the axis 12 substantially equal to the sections defined by the rows 16.

Once it has induced rotation of the disk 12, the member 22 extending from the air cylinder releases its engagement on the notch 26 to which it is engaged, and moves rearward on the circumference of the disk 12, to engage a trailing notch 26, operatively positioned to cause the rows of recesses 18 to radially move around the axis 41 in increments equal to their incremental registered positions on the disk 12 and around the rotational axis 41.

Because the recesses 18 holding individual fruits in the rows 16 on the disk 12, sequentially move to registered positions around the axis 41, the cherries or other fruit occupying the recesses 18 may be sequentially processed to remove the pits from their centers. An aperture 19 communicates from the bottom surface 21 of the disk 12, opposite the recesses 18 in the top surface of the disk 12.

At one incremental position of each row 16 containing cherries or fruit in the recesses 18, the fruit is pitted by a plurality of powered needles 30 such as air driven translating pitting needles 30 which are driven by an air drive 31,through each respective fruit and through the aperture 19 communicating through the disk 12 with each respective recess 18.

Adjacent to the underside of each such aperture 19 is a rubber or other flexible member 23 having a plurality of shaped apertures 25 therein dimensioned to slidably and cooperatively engage the exterior of the star shaped pitting needles 30 passing through the apertures 19 and the aligned shaped apertures 25. The flexible member 23 contacting the star-shaped apertures 25 therein hugs the star-shaped needles 30 passing therethrough, and allows the pit to pass through one direction, but form an aperture too small to allow it to pass in the other direction. The small flexible blade portions 32 formed in apertures of the flexible member 23 conform to the shape of the stare-shaped needles 30 and hug its surface during translation and thereby pull the pit from the pitting needles 30 as they translate away from engagement therethrough.

So pulled, the pits fall into a collection container under the bottom surface 21. Optionally but preferred, an optical system or other sensor 45 or other means to monitor pit removal, will monitor each aperture 19 from each recess 18 as the pit needles 30 pass, and ascertain if a pit has been accounted for by using light and or cameras and software adapted to the task.

For each aperture 19 and recess 18 combination where a pit is counted, the remaining fruit is pushed or blown using air jets 46 operatively connected to the air supply to remove the fruit that is now depitted from its depression 18 and into a collection container for good fruit. Should the sensors 45 sense that a pit has not been pushed from the fruit by the pitting needle 30, that individual fruit ascertained to not have a pit removed, will be pushed or blown to a different collection container for reprocessing. In this fashion, it is determined that all fruit is pitted before moving from the device 12.

Switching in the preferred mode is performed by air switches which operate based on the position of the disk 12 and the notches 26 in the registered radial positions. Those skilled in the art will realize that other means for switching may be employed such as electrical and such is anticipated. Due to the simplicity of using compressed air to operate the device 12, and since most small farms and producers have a compressed air supply, the use of compressed air and air switching is especially preferred.

Biased flexible members 32 such as formed of spring steel, are provided as an additional means to maintain the disk 12 in individual registered positions or radial positions around the axis 41. The members 32 have surfaces adapted to engage with the notches 26 in the disk 12 and provide a means to only allow one-way rotation in the direction away from the ramp 14 and toward the needles 30. The Biased members 32 settling into the notches 26 may also be used as mechanical means to trip air switches (not shown) to cause the needles 30 to translate through the fruit to remove the pits. Of course other means to engage the notches 26 may be employed to temporarily hold the disk 12 in position and such is anticipated.

While all of the fundamental characteristics and features of the disclosed method of employing a rotating disk and pitting needles to pit fruit been described herein, with reference to particular embodiments thereof, a latitude of modification, various changes and substitutions are intended in the foregoing disclosure and it will be apparent that in some instances, some features of the invention will be employed without the corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

Further, the purpose of the herein disclosed abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. An apparatus for removal of pits from fruit, comprising:
   a frame;
   a planar disk, with flat top and bottom surfaces, without bends on said top and bottom surfaces, rotationally engaged upon an axis point, said axis point engaged to a member upon said frame;
   said top surface having a plurality of rows of depressions formed therein, said depressions formed in radially extending rows;
   apertures formed in said depressions and communicating between said depression and said bottom surface of said disk opposite said top surface;
   a ramp for dispersing fruit upon said top surface of said disk;
   said disk rotating on an axis point engaged to said frame;
   said disk having an incline, said incline positioning a first half of said disk at an elevation higher than said axis point and a second half of said lower than said axis point;
   said ramp having a distal end located adjacent to said top surface of said disk at a deposit point for said fruit upon said disk;
   said distal end extending along a substantial length of said planar disk such that said row of depressions pass beneath said distal end when said planar disk rotates on said axis point;
   said incline urging said fruit toward said deposit point during said rotation of said disk;
   said depressions configured to engage upon an outside surface of said fruit positioned in said deposit point and overcome said urging provided by said incline;
   said depressions engaged with said fruit rotatable to a pitting position adjacent to a plurality of translating needles, each of said needles positioned in a registered engagement with any said depression positioned thereunder; and
   said needles aligned to translate through said fruit and said apertures and thereby remove pits from within said fruit, whereby said fruit deposited upon said top surface is continually urged in a direction opposite said rotation of said disk and remains adjacent to said ramp unless engaged by a said depression and carried to said pitting, wherein said needles will de-pit said fruit.

2. The apparatus for removal of pits from fruit of claim 1 additionally comprising:
   a flexible member located under said apertures;
   said flexible member having member apertures therein aligned to each of said needles and sized to slide thereon; and
   said member apertures having flexible radial extensions therein, said extensions pulling one of said pits from said needle when said needle retracts upward after passing downward through said disk.

3. The apparatus for removal of pits from fruit of claim 2 additionally comprising:
   notches formed in a circumferential edge of said disk adjacent to a last of said depressions in each of said rows; and
   means to temporarily engage said notches to hold said disk in a temporary stationary position and thereby maintain said needles aligned to translate through said fruit and said apertures.

4. The apparatus for removal of pits from fruit of claim 3 additionally comprising:
   said disk being from a kit of said disks, each disk of said kit being engageable for a rotation on said axis point;
   each disk of said kit having one or a combination of a group of fruit engaging adaptations including, a varied diameter to said depressions and a varied number of said depressions in each said row.

5. The apparatus for removal of pits from fruit of claim 4 additionally comprising:
said disk rotating on said axis point through rotation of said disk in radial increments;
said rotation in radial increments comprising a pneumatic cylinder having a translating arm;
said translating arm in a communication with a pin riding on said translating arm and temporarily engaging in sequential notches located on said circumferential edge; and
translation of said arm during an engagement of said pin with one of said notches thereby causing an incremental rotation of said disk.

6. The apparatus for removal of pits from fruit of claim 4 additionally comprising:
an inspection device for inspecting each of said apertures at a respective communication with said bottom surface to ascertain if said pit has been communicated through said aperture.

7. The apparatus for removal of pits from fruit of claim 3 additionally comprising:
said disk rotating on said axis point through rotation of said disk in radial increments;
said rotation in radial increments comprising a pneumatic cylinder having a translating arm;
said translating arm in a communication with a pin riding on said translating arm and temporarily engaging in sequential notches located on said circumferential edge; and
translation of said arm during an engagement of said pin with one of said notches thereby causing an incremental rotation of said disk.

8. The apparatus for removal of pits from fruit of claim 3 additionally comprising:
an inspection device for inspecting each of said apertures at a respective communication with said bottom surface to ascertain if said pit has been communicated through said aperture.

9. The apparatus for removal of pits from fruit of claim 2 additionally comprising:
said disk being from a kit of said disks, each disk of said kit being engageable for a rotation on said axis point;
each disk of said kit having one or a combination of a group of fruit engaging adaptations including, a varied diameter to said depressions and a varied number of said depressions in each said row.

10. The apparatus for removal of pits from fruit of claim 9 additionally comprising:
said disk rotating on said axis point through rotation of said disk in radial increments;
said rotation in radial increments comprising a pneumatic cylinder having a translating arm;
said translating arm in a communication with a pin riding on said translating arm and temporarily engaging in sequential notches located on a circumferential edge; and
translation of said arm during an engagement of said pin with one of said notches thereby causing an incremental rotation of said disk.

11. The apparatus for removal of pits from fruit of claim 9 additionally comprising:
an inspection device for inspecting each of said apertures at a respective communication with said bottom surface to ascertain if said pit has been communicated through said aperture.

12. The apparatus for removal of pits from fruit of claim 2 additionally comprising:
said disk rotating on said axis point through rotation of said disk in radial increments;
said rotation in radial increments comprising a pneumatic cylinder having a translating arm;
said translating arm in a communication with a pin riding on said translating arm and temporarily engaging in sequential notches located on a circumferential edge; and
translation of said arm during an engagement of said pin with one of said notches thereby causing an incremental rotation of said disk.

13. The apparatus for removal of pits from fruit of claim 2 additionally comprising:
an inspection device for inspecting each of said apertures at a respective communication with said bottom surface to ascertain if said pit has been communicated through said aperture.

14. The apparatus for removal of pits from fruit of claim 1 additionally comprising:
notches formed in a circumferential edge of said disk adjacent to a last of said depressions in each of said rows; and
means to temporarily engage said notches to hold said disk in a temporary stationary position and thereby maintain said needles aligned to translate through said fruit and said apertures.

15. The apparatus for removal of pits from fruit of claim 14 additionally comprising:
said disk being from a kit of said disks, each disk of said kit being engageable for a rotation on said axis point;
each disk of said kit having one or a combination of a group of fruit engaging adaptations including, a varied diameter to said depressions and a varied number of said depressions in each said row.

16. The apparatus for removal of pits from fruit of claim 15 additionally comprising:
said disk rotating on said axis point through rotation of said disk in radial increments;
said rotation in radial increments comprising a pneumatic cylinder having a translating arm;
said translating arm in a communication with a pin riding on said translating arm and temporarily engaging in sequential notches located on said circumferential edge; and
translation of said arm during an engagement of said pin with one of said notches thereby causing an incremental rotation of said disk.

17. The apparatus for removal of pits from fruit of claim 14 additionally comprising:
said disk rotating on said axis point through rotation of said disk in radial increments;
said rotation in radial increments comprising a pneumatic cylinder having a translating arm;
said translating arm in a communication with a pin riding on said translating arm and temporarily engaging in sequential notches located on said circumferential edge; and
translation of said arm during an engagement of said pin with one of said notches thereby causing an incremental rotation of said disk.

18. The apparatus for removal of pits from fruit of claim 1 additionally comprising:
said disk being from a kit of said disks, each disk of said kit being engageable for a rotation on said axis point;
each disk of said kit having one or a combination of a group of fruit engaging adaptations including, a varied diameter to said depressions and a varied number of said depressions in each said row.

19. The apparatus for removal of pits from fruit of claim 18 additionally comprising:

said disk rotating on said axis point through rotation of said disk in radial increments;

said rotation in radial increments comprising a pneumatic cylinder having a translating arm;

said translating arm in a communication with a pin riding on said translating arm and temporarily engaging in sequential notches located on a circumferential edge; and translation of said arm during an engagement of said pin with one of said notches thereby causing an incremental rotation of said disk.

20. The apparatus for removal of pits from fruit of claim 1 additionally comprising:

said disk rotating on said axis point through rotation of said disk in radial increments;

said rotation in radial increments comprising a pneumatic cylinder having a translating arm;

said translating arm in a communication with a pin riding on said translating arm and temporarily engaging in sequential notches located on a circumferential edge; and translation of said arm during an engagement of said pin with one of said notches thereby causing an incremental rotation of said disk.

\* \* \* \* \*